US011932063B2

(12) United States Patent
Vilcot et al.

(10) Patent No.: US 11,932,063 B2
(45) Date of Patent: Mar. 19, 2024

(54) TIRE FOR TWO-WHEELED VEHICLE COMPRISING A HYBRID HOOPING REINFORCEMENT

(71) Applicant: COMPAGNIE GENERALE DES ETABLISSEMENTS MICHELIN, Clermont-Ferrand (FR)

(72) Inventors: Florian Vilcot, Clermont-Ferrand (FR); Pierre Laurent, Clermont-Ferrand (FR); Claire Pucci, Clermont-Ferrand (FR); Aneta Babacz, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 169 days.

(21) Appl. No.: 17/293,789

(22) PCT Filed: Nov. 12, 2019

(86) PCT No.: PCT/FR2019/052683
§ 371 (c)(1),
(2) Date: Dec. 6, 2021

(87) PCT Pub. No.: WO2020/099774
PCT Pub. Date: May 22, 2020

(65) Prior Publication Data
US 2022/0288972 A1    Sep. 15, 2022

(30) Foreign Application Priority Data

Nov. 14, 2018  (FR) ........................................ 1871513
Jan. 28, 2019  (FR) ........................................ 1900730

(51) Int. Cl.
*B60C 9/22*    (2006.01)
*B60C 9/00*    (2006.01)
(Continued)

(52) U.S. Cl.
CPC ............ *B60C 9/0042* (2013.01); *B60C 9/005* (2013.01); *B60C 9/04* (2013.01); *B60C 9/20* (2013.01);
(Continued)

(58) Field of Classification Search
CPC ... B60C 9/005; B60C 9/22; B60C 2009/2252; B60C 2009/2285; B60C 2009/2261
See application file for complete search history.

(56) References Cited

U.S. PATENT DOCUMENTS 3,327,753 A     6/1967  Travers
10,688,828 B2   6/2020  Vallet et al.
(Continued)

FOREIGN PATENT DOCUMENTS

BR     PI0803609-8 A2    6/2009
EP     1623819 A1        2/2006
(Continued)

OTHER PUBLICATIONS

Machine translation of WO 02/09956, 2002.*
International Search Report dated Jan. 23, 2020, in corresponding PCT/FR2019/052683 (5 pages).

Primary Examiner — Justin R Fischer
(74) Attorney, Agent, or Firm — VENABLE LLP (57) ABSTRACT

A tire (10) for two-wheeled vehicles comprises a crown (12) comprising: a tread (20), and a hoop reinforcement (17) comprising at least one hooping ply (19) comprising one or more hoop reinforcing elements (44) comprising an assembly made up of a multifilament strand of aromatic polyamide or aromatic copolyamide (47) and of a multifilament strand of aliphatic polyamide (48). The twist factor K of the hoop reinforcing element (44) ranges from 5.5 to 6.5. The tire (10) is obtained by a method comprising a step of manufacturing the hooping ply (19), in which the bonded reinforcing elements (44) are embedded in a polymer composition in (Continued)

order to form the uncured hooping ply, the equivalent initial tensile modulus of the uncured hooping ply ranging from 330 to 620 cN/tex/dm.

12 Claims, 3 Drawing Sheets

(51) Int. Cl.
*B60C 9/04* (2006.01)
*B60C 9/20* (2006.01)
*D02G 3/04* (2006.01)
*D02G 3/38* (2006.01)
*D02G 3/48* (2006.01)

(52) U.S. Cl.
CPC ............... *D02G 3/045* (2013.01); *D02G 3/38* (2013.01); *D02G 3/48* (2013.01); *B60C 2009/0092* (2013.01); *B60C 2009/2077* (2013.01); *B60C 2009/2096* (2013.01); *B60C 2200/10* (2013.01); *D10B 2331/021* (2013.01)

(56) References Cited

U.S. PATENT DOCUMENTS

| | | |
|---|---|---|
| 2002/0185206 A1* | 12/2002 | Pereira ..................... B60C 9/22 |
| | | 152/559 |
| 2006/0027310 A1 | 2/2006 | Auclair |
| 2009/0090447 A1* | 4/2009 | Baldwin, Jr. ........... B60C 9/005 |
| | | 152/451 |
| 2012/0118456 A1 | 5/2012 | Schiavolin et al. |
| 2013/0025758 A1 | 1/2013 | Kim |
| 2018/0099529 A1 | 4/2018 | Vallet et al. |

FOREIGN PATENT DOCUMENTS

| | | | |
|---|---|---|---|
| EP | 2551127 A1 | | 1/2013 |
| FR | 1413102 | | 10/1965 |
| JP | 10-278508 A | | 10/1998 |
| WO | WO 02/09956 | * | 2/2002 |
| WO | WO 2004/085174 | * | 10/2004 |
| WO | 2011/012980 A1 | | 2/2011 |
| WO | 2016/156263 A1 | | 10/2016 |

* cited by examiner

TIRE FOR TWO-WHEELED VEHICLE COMPRISING A HYBRID HOOPING REINFORCEMENT

BACKGROUND

The present invention relates to a tyre for two-wheeled vehicles.

The invention will be described more particularly with reference to a tyre for vehicles of the motorbike or motorcycle type.

A tyre for vehicles of the motorbike type that is sold under the Michelin brand and belongs to the Pilot Road 4 range is known from the prior art, said tyre having the following dimensional characteristics: 120/70 ZR 17. Such a tyre comprises a tread and a hoop reinforcement extending in the crown in a circumferential direction of the tyre. The hoop reinforcement comprises a hooping ply comprising a hoop reinforcing element that forms an angle less than or equal to 10° with the circumferential direction of the tyre. Each hoop reinforcing element of the tyre comprises a twist-balanced assembly made up of two multifilament strands made of aramid that are assembled together and wound in a helix around one another with a twist of 440 turns per metre. Each multifilament strand has a count equal to 167 tex. The twist factor of the hoop reinforcing element is 8.4.

The tyre is obtained by a method comprising a step of manufacturing the hooping ply, in which the bonded hoop reinforcing element is embedded in a polymer composition in order to form the uncured hooping ply. The equivalent initial tensile modulus of the uncured hooping ply is 1705 cN/tex/dm. On account of the use of aramid, such a prior art tyre has a relatively high cost.

On the one hand, the hoop reinforcement has to make it possible, by virtue of suitable mechanical strength properties in the cured state, to exert a sufficient hooping force at the crown of the tyre, in particular when running at high speeds, in order to ensure that the profile of the tyre is maintained and that the tyre is kept in a maximum volume. This maximum volume is determined under the use conditions specified by the tyre manufacturer, as defined in the ETRTO (European Tyre and Rim Technical Organisation) document "Standards Manual", 2017, General Information, page M.29.

On the other hand, the hoop reinforcement has to allow, by virtue of suitable tensile modulus properties in the uncured state, a radial expansion and thus circumferential elongation of the crown of the tyre so as not to prevent the radial and circumferential deformations imposed on the tyre while it is being manufactured. The radial and circumferential deformations are applied in particular during the curing of the tyre, during which the tyre is expanded radially and circumferentially, for example by pressurization of an inflating membrane, so as to be pressed against the surfaces of the curing mould.

Moreover, since the equivalent initial tensile modulus of the uncured hooping ply of the prior art is relatively high, a small variation in the elongation caused by variability in the curing step causes significant variation in the equivalent initial tensile modulus of the uncured hooping ply within the tyre and therefore unpredictable modification of the performance thereof.

Lastly, the hoop reinforcement is involved in the achievement of a relatively high burst pressure, in this case at least equal to 15 bar.

The aim of the invention is a tyre for:
improving endurance,
allowing easy radial expansion that is less dependent on the variability in the curing step, and
reducing costs;
while ensuring the same performance compared with a prior art tyre, namely the maintaining of the profile of the tyre and the burst pressure.

SUMMARY

To this end, the subject of the invention is a tyre for two-wheeled vehicles, comprising a crown comprising:
a tread, and
a hoop reinforcement extending in the crown in a circumferential direction of the tyre, the hoop reinforcement comprising at least one hooping ply comprising one or more hoop reinforcing elements, the or each hoop reinforcing element forming an angle strictly less than 10° with the circumferential direction of the tyre, each hoop reinforcing element comprising an assembly made up:
of a multifilament strand of aromatic polyamide or aromatic copolyamide, and of a multifilament strand of aliphatic polyamide, the two strands being wound in a helix around one another and the hoop reinforcing element being twist-balanced, the twist factor K of the hoop reinforcing element ranging from 5.5 to 6.5 with K being defined by the formula:
$K=(R \times Ti^{1/2})/957$, in which R is the twist of the hoop reinforcing element expressed in turns per metre and Ti is the sum of the counts of the multifilament strands of the hoop reinforcing element in tex, and the tyre being obtained by a method comprising a step of manufacturing the hooping ply, in which the bonded hoop reinforcing element(s) is/are embedded in a polymer composition in order to form the uncured hooping ply, the equivalent initial tensile modulus of the uncured hooping ply ranging from 330 to 620 cN/tex/dm.

On account of its construction, the hoop reinforcing element is a filamentary element.

Thus, the use of a hybrid hoop reinforcing element comprising an assembly of monofilaments made of aromatic polyamide or aromatic copolyamide and of monofilaments made of aliphatic polyamide in the hooping ply makes it possible to obtain a tyre having a lower cost on account of the use of a multifilament strand of aliphatic polyamide, which has a cost lower than that of the strand of aromatic polyamide or aromatic copolyamide. Moreover, within the selected twist-factor interval, the hoop reinforcing element will improve the endurance compared with the prior art tyre while having an equivalent force at break and while maintaining the profile of the tyre and the burst pressure thereof.

DETAILED DESCRIPTION

Figure 1:
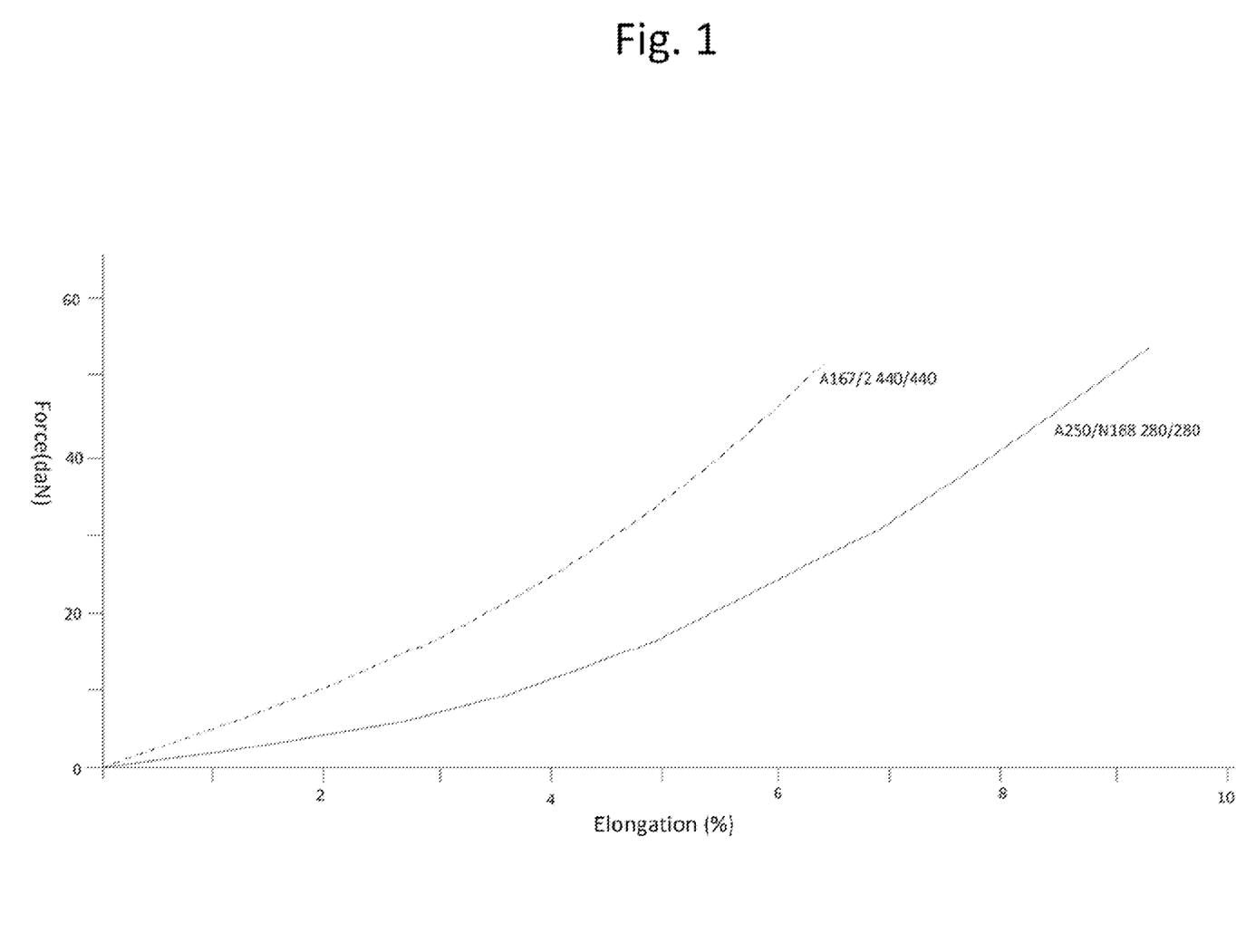
FIG. 1 is a force-elongation curve of a hoop reinforcing element of the prior art and that of the tyre according to the invention.

FIG. 1 shows a force-elongation curve of a hoop reinforcing element of the prior art tyre and of the tyre according to the invention. One effect of using a hybrid reinforcing element comprising an assembly of monofilaments made of aromatic polyamide or aromatic copolyamide and of monofilaments made of aliphatic polyamide is that a bi-modulus curve is obtained, that is to say one that has a relatively low modulus at small deformations and a relatively high modulus at large deformations. Specifically, the hoop reinforcing element has a relatively low modulus at small deformations, in this instance that of the strand of aliphatic polyamide, allowing good shaping of the tyre. Moreover, the reinforcing element exhibits a relatively high modulus at large deformations, in this instance that of the strand of aromatic polyamide or aromatic copolyamide, which will make it possible to maintain the profile of the tyre.

Unlike the reinforcing element of the prior art, the reinforcing element according to the invention exhibits a relatively low equivalent initial tensile modulus of the uncured hooping ply. Thus, even in the case of variability in the elongation of the reinforcing element during the curing step, the variation in the equivalent initial tensile modulus of the uncured hooping ply of the reinforcing element within the tyre remains low and does not modify, or only slightly modifies, the performance of the tyre.

It will be recalled that, as is well known, a filament made of aromatic polyamide or aromatic copolyamide is a filament of linear macromolecules formed of aromatic groups held together by amide bonds, at least 85% of which are directly connected to two aromatic cores, and more particularly poly(p-phenylene terephthalamide) (or PPTA) fibres, which have been manufactured for a very long time from optically anisotropic spinning compositions. Among the aromatic polyamides or aromatic copolyamides, mention may be made of polyaryl amides (or PAA, particularly known by the Solvay company trade name Ixef), poly (metaxylylene adipamide), polyphthalamides (or PPA, particularly known by the Solvay company trade name Amodel), amorphous semi-aromatic polyamides (or PA 6-3T, particularly known by the Evonik company trade name Trogamid), meta-aramids (or poly(metaphenylene isophthalamide) or PA MPD-I, particularly known by the Du Pont de Nemours company trade name Nomex) or para-aramids (or poly(paraphenylene terephthalamide) or PA PPD-T, particularly known by the Du Pont de Nemours company trade name Kevlar or the Teijin company trade name Twaron).

A filament made of aliphatic polyamide is understood to be a filament of linear macromolecules of polymers or copolymers containing amide functions that do not have aromatic rings and can be synthesized by polycondensation between a carboxylic acid and an amine. Among the aliphatic polyamides, mention may be made of nylons PA4.6, PA6, PA6.6 or PA6.10, and in particular Zytel from the company DuPont, Technyl from the company Solvay or Rilsamid from the company Arkema.

Twist-balanced is understood to mean that the two multifilament strands are wound with a substantially identical twist and that the twist of the monofilaments of each multifilament strand, that is to say the twist of the monofilaments of the multifilament strand of aromatic polyamide or copolyamide and the twist of the monofilaments of the strand of polyester is substantially zero. Specifically, the method for manufacturing these hoop reinforcing elements, which is well known in the prior art, comprises a first step during which each spun yarn of monofilaments (more properly referred to as a "yarn") is first of all twisted individually on itself (with an initial twist R1' and R2' with R1'=R2') in a given direction D'=D1'=D2' (the S or Z direction, respectively, according to recognized terminology denoting the orientation of the turns with respect to the transverse bar of an S or of a Z) to form a strand or overtwist (more properly referred to as a "strand") in which the monofilaments are deformed into a helix about the axis of the strand. Next, during a second step, the two strands are then twisted together with a final twist R3 such that R3=R1'=R2' in a direction D3 that is opposite to the direction D'=D1'=D2' (the Z or S direction, respectively) so as to obtain the reinforcing element (more properly referred to as a "cord").

This reinforcing element is then said to be twist-balanced, since the monofilaments of the two strands exhibit, in the final reinforcing element, the same residual twist, since R1'=R2'. This residual twist is zero or substantially zero, since R3=R1'=R2' and the direction D'=D1'=D2' is opposite to the direction D3. The expression "substantially zero residual twist" means that the residual twist is strictly less than 2.5% of the twist R3.

The expression "assembly made up" is understood to mean that the assembly does not comprise a multifilament strand other than the two multifilament strands of aromatic polyamide or aromatic copolyamide and of aliphatic polyamide.

The multifilament strand of aromatic polyamide or aromatic copolyamide and the multifilament strand of aliphatic polyamide are assembled together and are wound in a helix about one another.

The twist factor, denoted below by the letter K (also known as the twist multiplier), is defined by the formula:

$$K=(R \times Ti^{1/2})/957$$

in which R is the twist of the reinforcing element expressed in turns per metre (twist R3 described above) and Ti is the sum of the counts of the multifilament strands of the reinforcing element in tex.

The twist R of the reinforcing element can be measured using any method known to a person skilled in the art, for example in accordance with the standard ASTM D 885/D 885M-10a of 2014.

The count (or linear density) of each strand is determined in accordance with the standard ASTM D1423. The count is given in tex (weight in grams of 1000 m of product—as a reminder: 0.111 tex is equal to 1 denier).

A reinforcing element in the natural state is one in which the constituent material(s) of the reinforcing element are manufactured without any coating having an adhesive function covering this or these materials. Thus, a reinforcing element in the natural state can be bare, meaning that the constituent material(s) of the reinforcing element are not coated with any coating or are possibly sized, that is to say coated with a sizing composition having in particular the functions of facilitating the sliding of the constituent material(s) of the reinforcing element while it is being manufactured and of avoiding the build-up of electrostatic charges.

A bonded hoop reinforcing element is understood to mean that, while the hoop reinforcing element is being manufactured, the assembly made up of the two constituent multifilament strands of the hoop reinforcing element is covered with a coating having a bonding function.

Thus, in a first embodiment, assembly is carried out so as to form the hoop reinforcing element in the natural state, the hoop reinforcing filamentary element in the natural state is coated with an external layer of a thermally crosslinkable adhesive composition and the hoop reinforcing element in the natural state coated with the external layer is thermally treated so as to crosslink the adhesive composition in order to obtain the bonded hoop reinforcing element.

In a second embodiment, the hoop reinforcing element in the natural state is coated with an intermediate layer of a first thermally crosslinkable adhesive composition, the hoop reinforcing element in the natural state coated with the intermediate layer is thermally treated so as to crosslink the first adhesive composition in order to obtain a pre-bonded hoop reinforcing element, the pre-bonded hoop reinforcing element is coated with an external layer of a second thermally crosslinkable adhesive composition, and the pre-bonded hoop reinforcing element coated with the external layer is thermally treated so as to crosslink the second adhesive composition in order to obtain the bonded hoop reinforcing element.

In an advantageous embodiment, this coating is an adhesive composition. Such an adhesive composition is, for example, of the RFL (Resorcinol-Formaldehyde-Latex) type.

The equivalent initial tensile modulus of the uncured hooping ply is understood to mean the modulus calculated by multiplying the initial tensile modulus of the bonded hoop reinforcing element in cN/tex by the density of the hooping ply in terms of the number of threads of hoop reinforcing elements per decimetre.

The density of bonded hoop reinforcing elements in the hooping ply is the number of bonded hoop reinforcing elements included in one decimetre of the hooping ply in the direction perpendicular to the direction in which the bonded hoop reinforcing element(s) extend.

The initial tensile modulus of the bonded hoop reinforcing element is understood to mean the original gradient of the linear part of the force-elongation curve obtained under the conditions of the standard ASTM D 885/D 885M-10a of 2014, which occurs just after a standard preload of 0.5 cN/tex on the hoop reinforcing element, that is to say before crosslinking.

In an advantageous embodiment, the bonded hoop reinforcing element(s) extend parallel to one another.

In the description and the claims, any range of values denoted by the expression "between a and b" represents the range of values extending from more than a to less than b (that is to say excluding the end-points a and b), whereas any range of values denoted by the expression "from a to b" means the range of values extending from the end-point "a" as far as the end-point "b", that is to say including the strict end-points "a" and "b".

The expression axial direction means the direction substantially parallel to the axis of rotation of the tyre.

The expression circumferential direction means the direction that is substantially perpendicular both to the axial direction and to a radius of the tyre (in other words, tangent to a circle centred on the axis of rotation of the tyre).

The expression radial direction means the direction along a radius of the tyre, namely any direction that intersects the axis of rotation of the tyre and is substantially perpendicular to that axis.

The expression median plane (denoted M) means the plane perpendicular to the axis of rotation of the tyre that is situated mid-way between the two beads and passes through the middle of the crown reinforcement.

The equatorial circumferential plane (denoted E) of the tyre is the theoretical plane passing through the equator of the tyre, perpendicular to the median plane and to the radial direction. The equator of the tyre is, in a circumferential section plane (plane perpendicular to the circumferential direction and parallel to the radial and axial directions), the axis parallel to the axis of rotation of the tyre and situated on the plane passing through the radially inner ends of the tread.

Advantageously, the hoop reinforcing elements are embedded in a polymer composition.

A polymer composition or polymeric composition is understood to mean that the composition comprises at least one polymer. Preferably, such a polymer may be a thermoplastic, for example a polyester or a polyamide, a thermosetting polymer, an elastomer, for example natural rubber, a thermoplastic elastomer or a combination of these polymers.

Advantageously, the twist factor K of the hoop reinforcing element ranges from 5.7 to 6.4, preferably from 5.9 to 6.3, and more preferably from 6.0 to 6.2.

Thus, in this twist factor range, the hoop reinforcing element will allow the tyre to have improved endurance while ensuring the maintaining of the profile of the tyre and the burst pressure.

Advantageously, the equivalent initial tensile modulus of the uncured hooping ply ranges from 380 to 600 cN/tex/dm, preferably from 400 to 550 cN/tex/dm, and more preferably from 420 to 520 cN/tex/dm.

Thus, within this equivalent initial tensile modulus interval of the uncured hooping ply, the modulus at small deformations is lowered compared with that of the hoop reinforcing element of the prior art comprising two strands of aramid on account of the presence of the strand of aliphatic polyamide, which allows good radial expansion of the hooping ply and therefore easy circumferential elongation of the crown of the tyre. Thus, this initial modulus interval allows good shaping of the tyre.

Advantageously, the twist of the hoop reinforcing element ranges from 240 to 350 turns per metre, and preferably from 240 to 300 turns per metre.

For a given count, within this twist interval, the hoop reinforcing element exhibits sufficient endurance to be used in a tyre for two-wheeled vehicles and a lower risk of spread on its force at break compared with the prior art tyre, in which the twist is relatively high.

Advantageously, the count of the multifilament strand of aromatic polyamide or aromatic copolyamide is greater than or equal to 180 tex, preferably greater than or equal to 200 tex, more preferably greater than or equal to 220 tex, and even more preferably greater than or equal to 240 tex.

Advantageously, the count of the multifilament strand of aromatic polyamide or aromatic copolyamide is less than or equal to 350 tex, preferably less than or equal to 330 tex, more preferably less than or equal to 300 tex, and even more preferably less than or equal to 260 tex.

Within the twist-factor interval according to the invention, by using counts lower than the intervals described above, the reinforcing element would exhibit a relatively high twist, and this would lead to a risk of spread on the force at break. Conversely, by using counts higher than the intervals described above, the reinforcing element would exhibit a relatively low twist, and this would lead to a risk of reduced endurance. Thus, the above-described count intervals for the multifilament strand of aromatic polyamide or aromatic copolyamide make it possible to obtain preferably a good compromise between force at break and endurance.

Advantageously, the count of the multifilament strand of aliphatic polyamide is greater than or equal to 150 tex, preferably greater than or equal to 160 tex, more preferably greater than or equal to 170 tex, and even more preferably greater than or equal to 180 tex.

Advantageously, the count of the multifilament strand of aliphatic polyamide is less than or equal to 300 tex, preferably less than or equal to 280 tex, more preferably less than or equal to 250 tex, and even more preferably less than or equal to 220 tex.

In a similar way to the count of the multifilament strand of aromatic polyamide or aromatic copolyamide, in the above-described count intervals for the multifilament strand of aliphatic polyamide, the hoop reinforcing element exhibits preferably a good compromise between force at break and endurance.

Advantageously, the initial tensile modulus of the bonded hoop reinforcing element ranges from 4.5 to 6.2 cN/tex, and preferably from 4.6 to 6.0 cN/tex.

Thus, as explained above, within this initial tensile modulus interval of the bonded reinforcing element, the modulus at small deformations is lowered on account of the presence of the strand of aliphatic polyamide, this allowing good radial expansion of the hooping ply.

Preferably, the density of hoop reinforcing elements in the hooping ply ranges from 60 to 110 hoop reinforcing elements per decimetre of hooping ply, preferably from 75 to 105 hoop reinforcing elements per decimetre of hooping ply, and more preferably from 85 to 95 hoop reinforcing elements per decimetre of hooping ply.

Within these hoop reinforcing element density intervals, the hooping ply exhibits a relatively high force at break, allowing it to be used in tyres for two-wheeled vehicles and allowing a relatively low cost on account, for the one part, of the presence of fewer reinforcing elements compared with the prior art hooping ply having a substantially equivalent hooping ply force at break, and, for the other part, of the presence of the strand of aliphatic polyamide.

Advantageously, the force at break of the hoop reinforcing element ranges from 40 to 70 daN, and preferably from 45 to 65 daN.

Advantageously, the force at break of the hooping ply ranges from 360 to 630 daN/cm, and preferably from 405 to 585 daN/cm.

The force at break of a ply is calculated from a force-elongation curve obtained by applying the standard ASTM D 885/D 885M-10a of 2014 to a hoop reinforcing element. The force at break of the hooping ply is determined by multiplying the force at break of the hoop reinforcing element by the number of hoop reinforcing elements per cm of hooping ply, this number being determined in a direction perpendicular to the direction in which the hoop reinforcing elements extend in the hooping ply.

Advantageously, the tyre according to the invention comprises two sidewalls, two beads, each sidewall connecting each bead to the crown, a carcass reinforcement arranged radially on the inside of the crown, the carcass reinforcement comprising at least one carcass ply that is anchored in each of the beads and extends in the sidewalls, wherein the hoop reinforcement is radially interposed between the carcass reinforcement and the tread.

Advantageously, the hoop reinforcement is directly in contact with the tread and the carcass reinforcement.

The expression directly in contact is understood to mean that no other ply reinforced by metal or textile reinforcing elements is arranged radially between the tread and the hoop reinforcement, or between the hoop reinforcement and the carcass reinforcement. In one embodiment, a composition is deposited between the plies in order to increase the green tack between the hoop reinforcement and the carcass reinforcement and, in the same way, a composition is deposited between the plies in order to increase the green tack between the tread and the hoop reinforcement.

Advantageously, the degree of curvature of the tyre ranges from 0.15 to 0.40, and preferably from 0.20 to 0.30.

Figure 2:
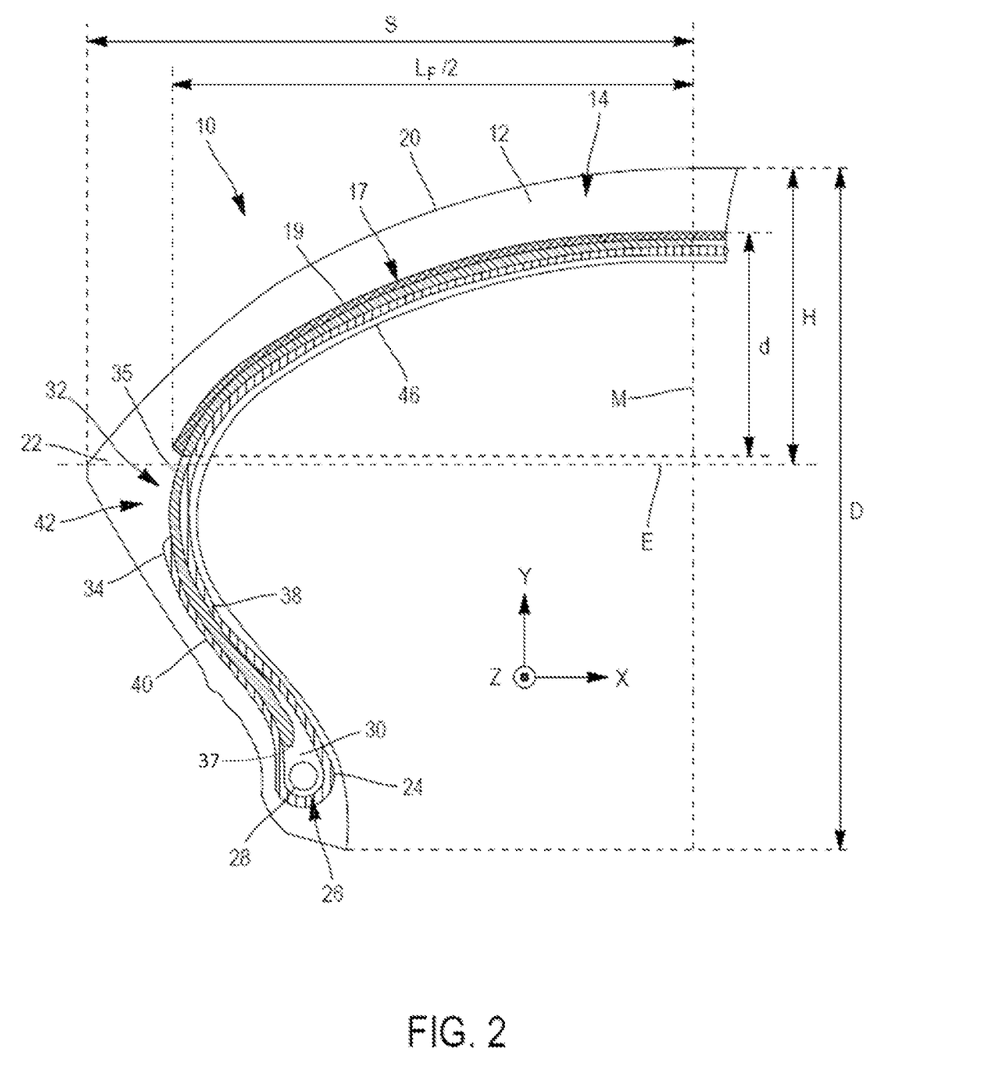
FIG. 2 illustrates a tyre for two-wheeled vehicles according to the invention.

As can be seen from the tyre for two-wheeled vehicles that is shown in FIG. 2, the tyre for two-wheeled vehicles has a highly curved tread, having a significant curvature.

In particular, this curvature is expressed by the value of the degree of curvature H/2S, wherein H represents the radial height of the tread with respect to the equatorial circumferential plane E passing through the radially inner ends of said tread, and 2S represents the maximum axial width of said tread, as shown in FIG. 2.

On account of the significant degree of curvature and the fact that the hoop reinforcement extends in line with virtually the entire tread, the radial height of the hooping ply is relatively high.

Advantageously, the ratio of the radial height d at which the hooping ply extends radially in the tyre to the radial height D at which the tyre extends radially is greater than or equal to 10%, and preferably greater than or equal to 20%.

Advantageously, the hoop reinforcement is made up of a single hooping ply.

Advantageously, the or each hoop reinforcing element makes an angle less than or equal to 7°, and preferably less than or equal to 5°, with the circumferential direction of the tyre.

In one embodiment, the carcass reinforcement is made up of two carcass plies.

Thus, on account of the presence of these two carcass plies, the lateral stiffness will increase, the contact patch in which the tyre is in contact with the ground will decrease and thus allow a better response to the driving of the two-wheeled vehicle on account of lower loads exerted by the tyre on the handlebar.

In another embodiment, the carcass reinforcement is made up of a single carcass ply.

Thus, the presence of a single carcass ply makes it possible to obtain a tyre with a carcass reinforcement that is more flexible than a tyre with a carcass reinforcement that comprises several carcass plies. Thus, the vertical stiffness of the tyre is limited, and therefore the comfort of the vehicle on which the tyre is fitted is increased.

Each carcass ply comprises several carcass reinforcing filamentary elements.

In an advantageous embodiment, each carcass reinforcing filamentary element is a textile filamentary element.

By definition, textile means a non-metal filamentary element made up of one or more elementary textile monofilaments optionally coated with one or more layers of a coating based on an adhesive composition. Each elementary textile monofilament is obtained, for example, by melt spinning, solution spinning or gel spinning. Each elementary textile monofilament is made from an organic material, in particular a polymeric material, or an inorganic material, for example glass or carbon. The polymeric materials may be of the thermoplastic type, for example aliphatic polyamides, in particular polyamides 6,6, and polyesters, in particular polyethylene terephthalate. The polymeric materials may be of the non-thermoplastic type, for example aromatic polyamides, in particular aramid, and cellulose, either natural or artificial, in particular rayon.

Preferably, each carcass reinforcing filamentary element extends axially from one bead of the tyre to the other bead of the tyre.

Advantageously, the carcass ply comprises at least one carcass reinforcing element, the angle of each carcass reinforcing element with the circumferential direction of the tyre ranging from 65° to 90°.

Advantageously, the tyre comprises a hoop reinforcing element comprising an assembly made up:
of a multifilament strand of aramid having a count that ranges from 230 to 270 tex and
of a multifilament strand of polyamide 6,6 having a count that ranges from 168 to 215 tex, the two strands being wound in a helix around one another and the reinforcing element being twist-balanced, the twist of the reinforcing element ranging from 260 to 300 turns per metre.

More advantageously, the tyre comprises a hoop reinforcing element comprising an assembly made up:
of a multifilament strand of aramid having a count that ranges from 240 to 260 tex and
of a multifilament strand of polyamide 6,6 having a count that ranges from 178 to 198 tex,
the two strands being wound in a helix around one another and the reinforcing element being twist-balanced, the twist of the reinforcing element ranging from 270 to 290 turns per metre.

BRIEF DESCRIPTION OF THE DRAWINGS

The invention will be understood better in light of the following description, which is given solely by way of non-limiting example and with reference to the drawings, in which.

EXAMPLE OF A TYRE ACCORDING TO THE INVENTION

FIG. 2 shows a reference frame X, Y, Z corresponding to the usual axial (X), radial (Y) and circumferential (Z) directions, respectively, of a tyre.

FIG. 2 shows a tyre according to the invention, denoted by the general reference 10. The tyre 10 substantially exhibits revolution about an axis substantially parallel to the axial direction X. The tyre 10 is in this case intended for a two-wheeled vehicle.

The tyre 10 has a crown 12 comprising a tread 20 and a crown reinforcement 14 extending in the crown 12 in the circumferential direction Z.

The crown reinforcement 14 comprises a hoop reinforcement 17 comprising a single hooping ply 19. In this case, the hoop reinforcement 17 is made up of the hooping ply 19.

The crown reinforcement 14 is surmounted by the tread 20. The tyre 10 comprises two sidewalls 22 extending the crown 12 radially inwards. The tyre 10 also has two beads 24 that are radially on the inside of the sidewalls 22 and each have an annular reinforcing structure 26, in this instance a bead wire 28, surmounted by a mass of filling rubber 30, and also a radial carcass reinforcement 32. The crown reinforcement 14 is situated radially between the carcass reinforcement 32 and the tread 20. Each sidewall 22 connects each bead 24 to the crown 12.

The degree of curvature of the tyre ranges from 0.15 to 0.40, and preferably from 0.20 to 0.30. In this case, the degree of curvature is 0.25.

The ratio of the height d at which the hooping ply 19 extends radially in the tyre 10 to the height D at which the tyre 10 extends radially is greater than or equal to 10%, and preferably greater than or equal to 20%. In this case, the ratio d/D is 53%.

In an embodiment that is not illustrated here, the carcass reinforcement comprises a single carcass ply. In this embodiment that is not illustrated here, the carcass reinforcement is preferably made up of a carcass ply.

In this case, the carcass reinforcement 32 has two carcass plies 34, 35. The carcass ply 34, referred to as being turned up, is anchored in each of the beads 24 by being turned up around the bead wire 28 so as to form, within each bead 24, a main strand 38 extending from the beads 24 in the sidewalls 22 and into the crown 12, and a turnup strand 40, the radially outer end 42 of the turnup strand 40 being radially on the outside of the annular reinforcing structure 26.

The carcass ply 35 is anchored in each of the beads 24 without being turned up around the bead wire 28. The carcass ply 35 is referred to as being wrapped around. The radially inner end 37 of the carcass ply 35 is radially on the inside of the end 42 of the turnup strand 40 of the carcass ply 34. In addition, the radially inner end 37 of the carcass ply 35 is axially contained between the main strand 38 and the turnup strand 40 of the carcass ply 34.

The carcass reinforcement 32 thus extends from the beads 24 through the sidewalls 22 and into the crown 12. In this embodiment, the carcass reinforcement 32 also extends axially through the crown 12.

The hoop reinforcement 17 is radially interposed between the carcass reinforcement 32 and the tread 20. In this case, the hoop reinforcement 17 is directly in contact with the tread 20 and the carcass reinforcement 32.

Advantageously, each carcass ply 34, 35 comprises carcass reinforcing filamentary elements.

Preferably, each carcass reinforcing filamentary element is a textile filamentary element. Preferably, each carcass reinforcing filamentary element extends axially from one bead 24 of the tyre 10 to the other bead 24 of the tyre 10.

The carcass reinforcement 32 is radial in each sidewall 22 and in the crown 12. Thus, each carcass reinforcing element makes an angle ranging from 65° to 90° with the circumferential direction Z of the tyre 10, in this case 72° in the crown of the tyre.

In this case, the carcass reinforcing filamentary element comprises two strands comprising at least one monofilament, in this instance a first multifilament strand comprising a plurality of monofilaments and a second multifilament strand comprising a plurality of monofilaments.

In this instance, the monofilaments of the first and second strands are made from a material chosen chosen from aromatic polyamides, aromatic copolyamides, polyketones, polyesters, aliphatic polyamides, celluloses and mixtures of monofilaments of these materials, and in this case polyester.

The tyre 10 also comprises an airtight internal layer 46, preferably made of butyl, that is situated axially on the inside of the sidewalls 22 and radially on the inside of the crown reinforcement 14 and extends between the two beads 24.

Each hooping ply 19 and carcass ply 34, 35 comprises an elastomeric matrix in which one or more hoop reinforcing elements of the corresponding ply are embedded.

The single hooping ply 19 comprises at least one hoop reinforcing textile filamentary element 44. In this instance, the hooping ply 19 comprises a single hoop reinforcing element 44 wound continuously over an axial width $L_F$ of the crown 12 of the tyre 10.

The hoop reinforcing element 44 makes an angle strictly less than 10°, preferably less than or equal to 7°, and more preferably less than or equal to 5° with the circumferential direction Z of the tyre 10, and in this case less than 1°.

Figure 3:
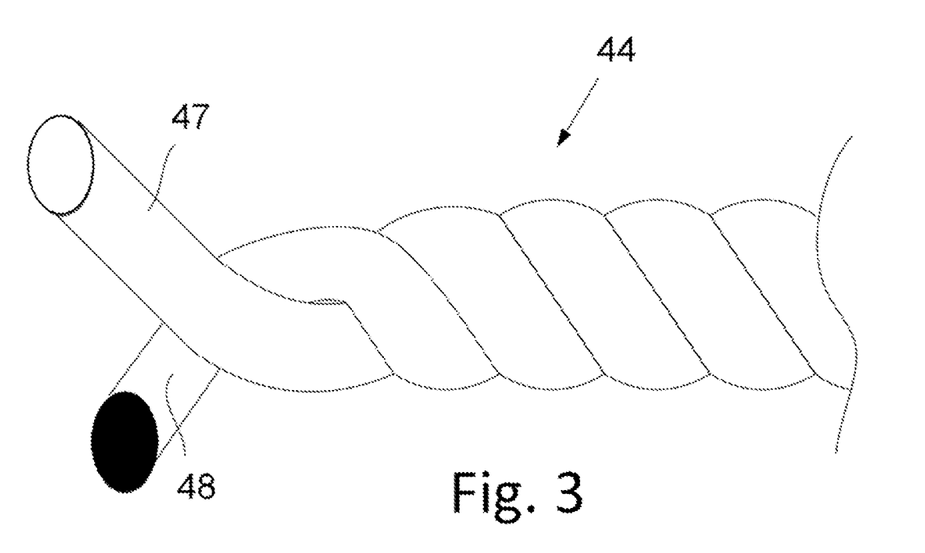
FIG. 3 is a schematic depiction of hoop reinforcing elements of the hooping ply of the tyre in FIG. 2.

The hoop reinforcing element 44, illustrated in FIG. 3, comprises at least one first strand 47 comprising at least one monofilament, in this instance a first multifilament strand comprising a plurality of monofilaments.

In this instance, the monofilaments of the first strand 47 are made from a material chosen from aromatic polyamides or copolyamides, and more preferably are made from para-aramid in this case.

The hoop reinforcing textile filamentary element 44 likewise comprises at least one second strand 48 comprising at least one monofilament, in this instance a second multifilament strand comprising a plurality of monofilaments.

In this instance, the monofilaments of the second strand 48 are made from a material chosen from aliphatic polyamides, and more preferably are made from nylon 6.6 in this case.

The two strands are wound in a helix around one another and the hoop reinforcing element 44 is twist-balanced, the twist factor K of the hoop reinforcing element 44 ranging from 5.5 to 6.5, preferably from 5.7 to 6.4, more preferably from 5.9 to 6.3, and even more preferably from 6.0 to 6.2. In this case, it is 6.1.

The tyre 10 is obtained by a method comprising a step of manufacturing the hooping ply 19, in which the bonded hoop reinforcing element(s) 44 is/are embedded in a polymer composition in order to form the uncured hooping ply, the equivalent initial tensile modulus of the uncured hooping ply ranging from 330 to 620 cN/tex/dm, preferably from 380 to 600 cN/tex/dm, more preferably from 400 to 550 cN/tex/dm, and even more preferably from 420 to 520 cN/tex/dm. In this case, it is 486 cN/tex/dm.

The twist of the hoop reinforcing element 44 ranges from 240 to 350 turns per metre, and preferably from 240 to 300 turns per metre. In this case, it is 280 turns per metre.

The count of the multifilament strand of aromatic polyamide or aromatic copolyamide 47 is greater than or equal to 180 tex, preferably greater than or equal to 200 tex, more preferably greater than or equal to 220 tex, and even more preferably greater than or equal to 240 tex, and the count of the multifilament strand of aromatic polyamide or aromatic copolyamide 47 is less than or equal to 350 tex, preferably less than or equal to 330 tex, more preferably less than or equal to 300 tex, and even more preferably less than or equal to 260 tex. In this case, it is 250 tex.

The count of the multifilament strand of aliphatic polyamide is greater than or equal to 150 tex, preferably greater than or equal to 160 tex, more preferably greater than or equal to 170 tex, and even more preferably greater than or equal to 180 tex, and the count of the multifilament strand of aliphatic polyamide is less than or equal to 300 tex, preferably less than or equal to 280 tex, more preferably less than or equal to 250 tex, and even more preferably less than or equal to 220 tex. In this case, it is 188 tex.

The initial tensile modulus of the bonded hoop reinforcing element 44 ranges from 4.5 to 6.2 cN/tex, and preferably from 4.6 to 6.0 cN/tex. In this case, it is 5.0 cN/tex.

The density of hoop reinforcing elements 44 in the hooping ply 19 ranges from 60 to 110 hoop reinforcing elements 44 per decimetre of hooping ply 19, preferably from 75 to 105 hoop reinforcing elements 44 per decimetre of hooping ply 19, and more preferably from 85 to 95 hoop reinforcing elements 44 per decimetre of hooping ply 19. In this case, it is 90 threads per decimetre of hooping ply 19.

The force at break of the hoop reinforcing element 44 ranges from 40 to 70 daN, and preferably from 45 to 65 daN. In this case, it is 54 daN.

The force at break of the hooping ply 19 ranges from 360 to 630 daN/cm, and preferably from 405 to 585 daN/cm. In this case, it is 486 daN/cm.

Method for Manufacturing the Tyre

The tyre 10 is manufactured using the method described below.

First of all, the carcass ply 34 is manufactured by arranging the reinforcing elements of each ply parallel to one another and embedding them, for example by skim coating, in an uncrosslinked composition comprising at least an elastomer, the composition being intended to form an elastomeric matrix once crosslinked. A ply known as a straight ply is obtained, in which the reinforcing textile filamentary elements of the ply are parallel to one another and are parallel to the main direction of the ply. Then, if necessary, portions of each straight ply are cut at a cutting angle and these portions are butted together so as to obtain what is known as an angled ply, in which the reinforcing textile filamentary elements of the ply are parallel to one another and form an angle with the main direction of the ply equal to the cutting angle.

Then, an assembly method as described in EP1623819 or in FR1413102 is implemented.

During this assembly method, the hoop reinforcement 17, in this case the hooping ply 19, is arranged radially on the outside of the carcass reinforcement 32. In this instance, in a first variant, a strip with a width B significantly less than $L_F$ is manufactured, wherein the bonded hoop reinforcing element 44 is embedded in an uncrosslinked composition and the strip is wound helically through several turns so as to obtain the axial width $L_F$. In a second variant, the hooping ply 19 having a width $L_F$ is manufactured in a similar manner to the carcass plies and the hooping ply 19 is wound through one turn over the carcass reinforcement 32. In a third variant, the bonded hoop reinforcing element 44 is wound radially on the outside of the carcass ply 32, and then a layer of a composition is deposited on top, in which the hoop reinforcing element 44 will be embedded during the curing of the tyre. In the three variants, the bonded hoop reinforcing element 44 is embedded in a composition in order to form, at the end of the method for manufacturing the tyre, the hooping ply 19 comprising the hoop reinforcing element 44.

After a step of laying the tread 20, the tyre is then obtained, in which the compositions of the elastomeric matrices are not yet crosslinked and are in an uncured state. This is referred to as a green form of the tyre.

Finally, the compositions are crosslinked, for example by curing or vulcanization, in order to obtain the tyre in which the compositions are in a crosslinked state. During this curing step, the tyre of which the elastomeric matrices are in the uncured state is expanded radially, circumferentially and axially, for example by pressurizing an inflating membrane, so as to press the tyre against surfaces of a curing mould. This radial and circumferential expansion is advantageously implemented here by virtue of the bonded hoop reinforcing filamentary elements.

Measurements and Comparative Tests

Comparison Between Hoop Reinforcing Elements

Table 1 summarizes the characteristics of the hoop reinforcing elements 44 and 45 of the tyres 10 and 10' according to the invention, of the control hoop reinforcing elements E1 to E5 and of the hoop reinforcing elements EdTA and EdTB of the prior art.

TABLE 1

| Hoop reinforcing element | EdTA | EdTB | E1 | E2 | E3 | E4 | E5 | 44 | 45 |
|---|---|---|---|---|---|---|---|---|---|
| Nature of the strands | p-Aramid/2 | p-Aramid/2 | p-Aramid/Nylon | p-Aramid/Nylon | p-Aramid/Nylon | p-Aramid/Nylon | p-Aramid/Nylon | p-Aramid/Nylon | p-Aramid/Nylon |
| Twist (t/m) | 440 | 315 | 200 | 250 | 290 | 210 | 230 | 280 | 260 |
| Count of the strands (tex) | 167/167 | 167/167 | 167/140 | 167/140 | 167/140 | 250/188 | 250/188 | 250/188 | 250/188 |
| Twist factor K | 8.4 | 6.0 | 3.7 | 4.6 | 5.3 | 4.6 | 5.0 | 6.1 | 5.7 |
| Force at break (daN) | 52 | 57 | 36 | 36 | 40 | ≥57 | ≥57 | 54 | ≥57 |
| Initial modulus (cN/tex) | 14.7 | 15 | 8.4 | 7.2 | 5.9 | 6.7 | 6.0 | 5.0 | 5.6 |
| Hooping ply | NdTA | NdTB | N1 | N2 | N3 | N4 | N5 | 19 | 19' |
| Density (fils/dm) | 116 | 116 | 116 | 116 | 116 | 116 | 116 | 90 | 90 |
| Equivalent initial modulus (cN/tex/dm) | 1705 | 1740 | 974 | 835 | 684 | 777 | 696 | 450 | 504 |
| Force at break (daN/cm) | 603 | 661 | 418 | 418 | 464 | ≥661 | ≥661 | 486 | ≥513 |

Note that the hoop reinforcing elements 44 and 45 exhibit initial modulus values that are significantly lower than those of the hoop reinforcing elements EdTA and EdTB of the prior art. Specifically, the hoop reinforcing elements 44, 45 of the tyres according to the invention exhibit a relatively low modulus at small deformations, allowing good radial expansion of the ply.

The force at break of the hoop reinforcing elements 44 and 45 is sufficiently high to keep the tyre in a maximum volume and is involved in the achievement of a relatively high burst pressure. Moreover, this force at break of the hoop reinforcing element is satisfactory for combating road hazards of the kerbing or pothole impact, etc. type.

In the same way, the force at break of the hooping ply is high enough to maintain the profile of the tyre, to achieve a relatively high burst pressure and to combat road hazards.

Comparison of the Tyres

The tyre 10 according to the invention was compared with tyres PEdTA and PEdTB of the prior art, which each respectively comprise a hooping ply NdTA and NdTB obtained, respectively, from the bonded hoop reinforcing elements EdTA and EdTB of the prior art.

The tyre 10 according to the invention, comprising a hooping ply 19 obtained from the bonded hoop reinforcing element 44, was compared with control tyres P1 to P3, which each respectively comprise a hooping ply N1 to N3 obtained, respectively, from the control bonded hoop reinforcing elements E1 to E3.

First of all, the geometric integrities of the tyres PEdTA, PEdTB and 10, for the one part, and the geometric integrities of the tyres P1 to P3 and 10, for the other part, were compared with one another by evaluating the dimensional integrity of the tyre by way of the centrifugal radius as defined in the ETRTO (European Tyre and Rim Technical Organisation) document "Standards Manual", 2017, General Notes, page M.6.

Then, the burst pressure strengths of the tyres PEdTA, PEdTB and 10, for the one part, and the burst pressure strengths of the tyres P1 to P3 and 10, for the other part, were compared with one another by inflating each tested tyre and by measuring the pressure up to the burst pressure.

Next, the compression fatigue strength, in other words the endurance under compression, of a tyre 10 compared with that of the tyres PEdTA, PEdTB, P1 to P3 was tested. The tyres PEdTA, PEdTB, P1 to P3 are not in accordance with the invention. In order to evaluate endurance, each tested tyre was run over a distance in this case of 150 km at a determined speed in this case of 70 km/h with a high braking torque and under a high load, in this case 280 daN at a pressure of 2.3 bar. The residual forces at break of the hoop reinforcers of the various tyres were next compared with one another.

Finally, the material cost was evaluated by comparing the cost of the strands of aramid and of nylon by multiplying them by their density in the hooping ply in order to have the cost relative to the area in metres squared of hooping ply.

The results are collated in Table 2 below.

The indication NT indicates that the tyre was not tested.

The maintaining of the profile of the tested tyres is indicated in Table 2. Very poor maintaining of the profile is indicated by the sign "−−" and poor maintaining of the profile is indicated by the sign "−". Good maintaining of the profile is indicated by the sign "+". Very good maintaining of the profile is indicated by the sign "++".

In the same way, the burst pressure strength, endurance and material cost saving of the tested tyres are indicated: very poor is indicated by the sign "−−", poor is indicated by the sign "−", good is indicated by the sign "+" and very good is indicated by the sign "++".

TABLE 2

| Reinforcing element | EdTA | EdTB | E1 | E2 | E3 | 44 |
|---|---|---|---|---|---|---|
| Hooping ply | NdTA | NdTB | N1 | N2 | N3 | 19 |
| Tyre | PEdTA | PEdTB | P1 | P2 | P3 | 10 |
| Maintaining of the profile | ++ | ++ | ++ | − | −− | ++ |
| Burst pressure | ++ | ++ | + | + | −− | ++ |
| Ease of radial expansion | −− | −− | − | − | + | ++ |

TABLE 2-continued

| Reinforcing element | EdTA | EdTB | E1 | E2 | E3 | 44 |
|---|---|---|---|---|---|---|
| Endurance under compression test | + | + | -- | -- | ++ | ++ |
| Material cost | -- | -- | ++ | ++ | ++ | ++ |

These results show that the tyre 10 according to the invention exhibits both very good maintaining of the profile and very good burst pressure strength equivalent to the tyres PEdTA and PEdTB of the prior art and, moreover, significantly greater endurance and also a significant material cost saving compared with the tyres PEdTA and PEdTB of the prior art.

Moreover, compared with the control tyres P1 and P2, it is observed in particular that the tyre 10 has an endurance under compression that is significantly greater. This excellent endurance is the result of the combination of the twist factor K ranging from 5.5 to 6.5 and the use of a multifilament strand of aliphatic polyamide. At an equivalent endurance, it is observed that the tyre P3 does not exhibit good maintaining of the profile or good burst pressure strength, while the tyre 10 verifies all these criteria.

Finally, compared with the control tyres P1 and P2 and E1 to E3, it is observed in particular that the tyre 10 has an ease of radial expansion that is much easier, thereby making it less dependent on the variability of the curing step.

The tyre 10 according to the invention, while having both very good maintaining of the profile and very good burst pressure strength, therefore exhibits improved endurance while having a much improved material cost saving and allowing easy radial expansion that is less dependent on the variability of the curing step.

Thus, as the comparative tests above show, the invention clearly consists in a tyre comprising hoop reinforcing elements made up of a multifilament strand of aromatic polyamide or aromatic copolyamide, and of a multifilament strand of aliphatic polyamide, the two strands being wound in a helix around one another and the hoop reinforcing element being twist-balanced, the twist factor K of the hoop reinforcing element ranging from 5.5 to 6.5, and the tyre being obtained by a method comprising a step of manufacturing the hooping ply, in which the bonded hoop reinforcing element(s) is/are embedded in a polymer composition so as to form the uncured hooping ply, the equivalent initial tensile modulus of the uncured hooping ply ranging from 330 to 620 cN/tex/dm.

The invention is not limited to the above-described embodiments.

It may also be possible to combine the features of the different embodiments and variants described or envisaged above, as long as these are compatible with one another and in accordance with the invention.

The invention claimed is:

1. A tire, for two-wheeled vehicles, comprising a crown, two sidewalls, two beads, each sidewall connecting each bead to the crown, a carcass reinforcement arranged radially on an inside of the crown, the carcass reinforcement comprising at least one carcass ply that is anchored in each of the beads and extends in the sidewalls, wherein the crown comprises:

a tread; and a hoop reinforcement extending in the crown in a circumferential direction of the tire, the hoop reinforcement comprising at least one hooping ply comprising one or more hoop reinforcing elements, each hoop reinforcing element forming an angle strictly less than 10° with the circumferential direction of the tire, wherein the force at break of the at least one hooping ply ranges from 360 to 630 daN/cm, wherein each hoop reinforcing element comprises an assembly made up:
of a multifilament strand of aromatic polyamide or aromatic copolyamide, and
of a multifilament strand of aliphatic polyamide, wherein the two multifilament strands are wound in a helix around one another and each hoop reinforcing element is twist-balanced, the twist factor K of each hoop reinforcing element ranging from 5.5 to 6.5 with K being defined by the formula:

$K=(R \times Ti^{1/2})/957$, in which R is a twist of a given hoop reinforcing element expressed in turns per meter and Ti is a sum of counts of the multifilament strands of the given hoop reinforcing element in tex, wherein a density of each hoop reinforcing element in the hooping ply ranges from 85 to 95 hoop reinforcing elements per decimeter of hooping ply, wherein the force at break of each hoop reinforcing element ranges from 40 to 70 daN, wherein the hoop reinforcement is radially interposed between the carcass reinforcement and the tread, extends axially across median plane M and has width $L_F$ that is smaller than a total thread width 2S, and is directly in contact with the tread and the carcass reinforcement over its entire width, and wherein the tire is obtained by a method comprising a step of manufacturing the hooping ply, in which the one or more hoop reinforcing elements are embedded in a polymer composition in order to form an uncured hooping ply, an equivalent initial tensile modulus of the uncured hooping ply ranging from 330 to 620 cN/tex/dm.

2. The tire according to claim 1, wherein the twist factor K of each hoop reinforcing element ranges from 5.7 to 6.4.

3. The tire according to claim 1, wherein the equivalent initial tensile modulus of the uncured hooping ply ranges from 380 to 600 cN/tex/dm.

4. The tire according to claim 1, wherein the twist of each hoop reinforcing element ranges from 240 to 350 turns per meter.

5. The tire according to claim 1, wherein the initial tensile modulus of the one or more hoop reinforcing elements ranges from 4.5 to 6.2 cN/tex.

6. The tire according to claim 1, wherein a degree of curvature ranges from 0.15 to 0.40.

7. The tire according to claim 1, wherein a ratio of a height d at which the hooping ply extends radially in the tire to a height D at which the tire extends radially is greater than or equal to 10%.

8. The tire according to claim 1, wherein the hoop reinforcement is made up of a single hooping ply.

9. The tire according to claim 1, wherein each hoop reinforcing element makes an angle less than or equal to 7° with the circumferential direction of the tire.

10. The tire according to claim 1, wherein the carcass reinforcement is made up of two carcass plies.

11. The tire according to claim 1, wherein the carcass reinforcement is made up of a single carcass ply.

12. The tire according to claim 1, wherein the at least one carcass ply comprises at least one carcass reinforcing element, the angle of each carcass reinforcing element with the circumferential direction of the tire ranging from 65° to 90°.

* * * * *